United States Patent [19]

Sharp

[11] Patent Number: 5,060,905

[45] Date of Patent: Oct. 29, 1991

[54] SELF-ADJUSTING MOUNTING ASSEMBLY FOR VEHICLE OUTSIDE REAR-VIEW MIRROR

[75] Inventor: Bernard C. Sharp, White Plains, N.Y.

[73] Assignee: Epicor Industries, Inc., Deerfield, Ill.

[21] Appl. No.: 362,771

[22] Filed: Aug. 24, 1989

[51] Int. Cl.⁵ .............................................. B60R 1/02
[52] U.S. Cl. .................................. 248/479; 248/487;
403/116
[58] Field of Search ............... 248/478, 477, 487, 289,
248/480, 479, 486, 475.1; 403/93, 84, 115, 116,
90; 16/361, 275, 273, 338, 342; 384/125, 908,
299; 350/632, 604

[56] References Cited

U.S. PATENT DOCUMENTS

| | | |
|---|---|---|
| 3,322,388 | 5/1967 | Budreck . |
| 3,384,334 | 1/1966 | Malachowski . |
| 3,667,718 | 10/1968 | Goslin et al. . |
| 3,778,015 | 12/1973 | Holzman ........................ 403/116 X |
| 3,934,807 | 1/1976 | Boutin . |
| 3,981,474 | 9/1976 | Szilagyi . |
| 4,077,597 | 3/1978 | Greig . |
| 4,165,156 | 8/1979 | O'Connell . |
| 4,186,905 | 2/1980 | Brudy . |
| 4,218,036 | 8/1980 | Pitkanen . |
| 4,477,199 | 10/1984 | Manzoni . |

Primary Examiner—Carl D. Friedman
Assistant Examiner—Korie H. Chan
Attorney, Agent, or Firm—Allegretti & Witcoff, Ltd.

[57] ABSTRACT

An impact or user displaceable self-adjusting mounting assembly for attaching an outside rear-view mirror to a vehicle includes two mounting brackets for attaching respective ends of a mirror support arm to the vehicle. The upper bracket provdes an articulated joint between the bracket and the vehicle to permit adjustment of the mirror and support arm in a generally vertical orientation. The upper bracket also provides a pivot axis about which the support arm can be rotated in a generally horizontal orientation either by the user or upon impact. A detent mechanism provides a position selection and retaining means for the mirror support arm. The lower mounting bracket also provides a pivot axis for the mirror support arm and includes self-adjusting means for maintaining the lower pivot axis colinear with the upper pivot axis independent of the vehicle profile. The self-adjusting means includes a rivet and an elongated slot which permits the support arm to be adjusted in its angular displacement relative to a plate affixed to the vehicle so that the pivot sxis defined by the rivet remains in coaxial alignment with the upper bracket pivot axis.

7 Claims, 2 Drawing Sheets

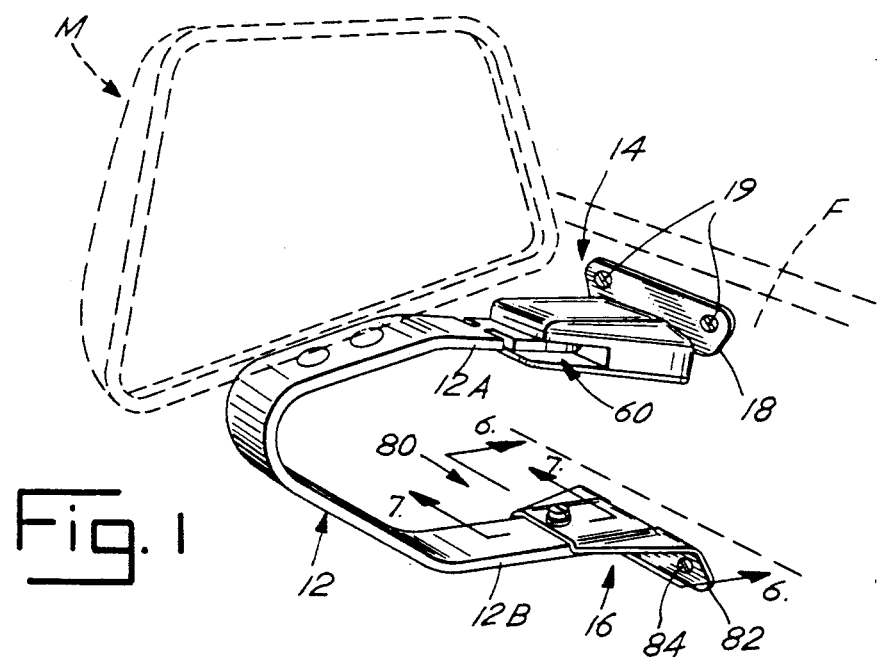
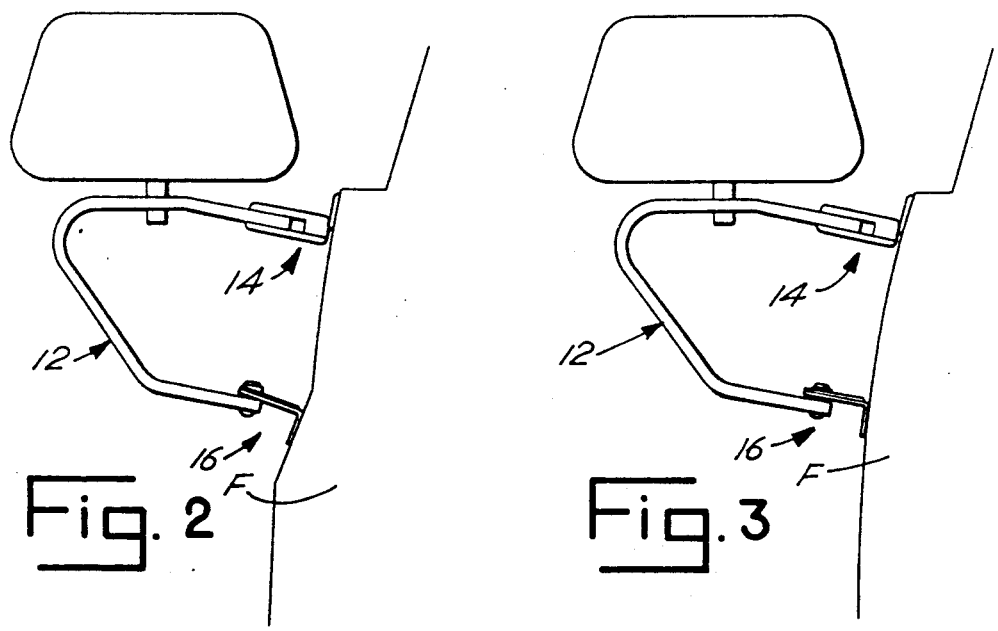

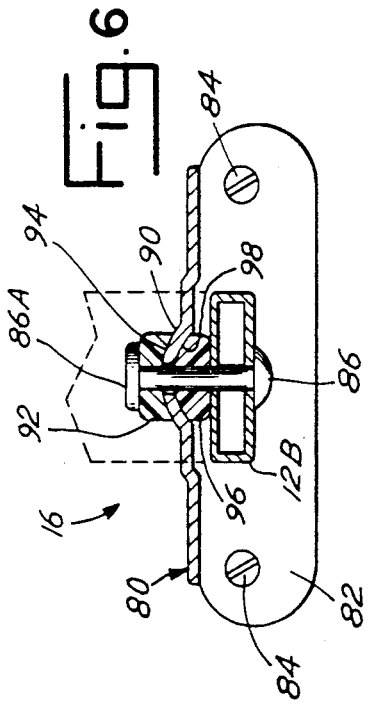
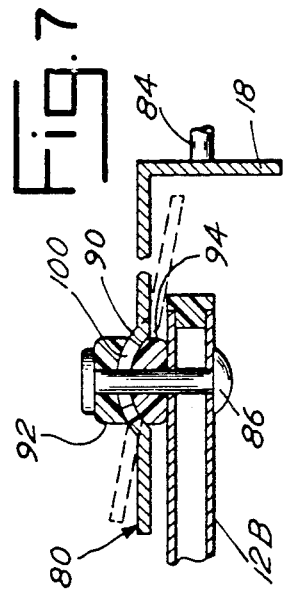
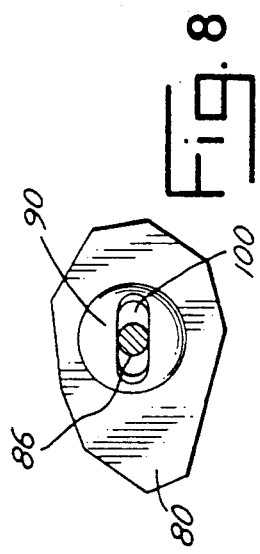
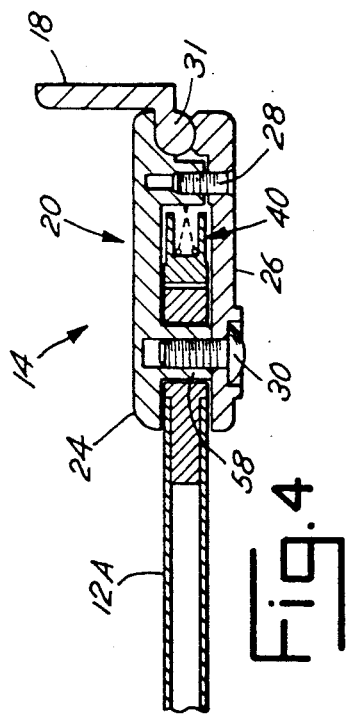
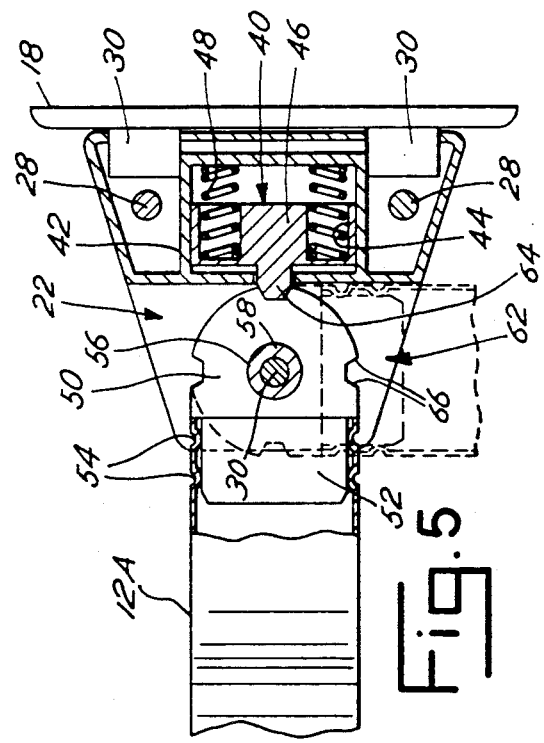

SELF-ADJUSTING MOUNTING ASSEMBLY FOR VEHICLE OUTSIDE REAR-VIEW MIRROR

BACKGROUND OF THE INVENTION

The invention relates generally to support or mounting brackets used to affix accessories to vehicles. More particularly, the invention relates to displaceable mounting brackets for supporting an outside rear-view mirror on a vehicle such as a truck or van.

Over the years, numerous designs of displaceable outside rear-view mirrors for vehicles have been proposed. A recurring disadvantage, however, was that the support or mounting bracket had to be designed for a particular vehicle body profile to insure an adequate field of view. A bracket that conformed to a somewhat vertical profile of the vehicle cab could not be used on, for example, a more rounded cab profile without a substantial modification of the bracket. Without such a modification, or realignment of the mirror, simply placing the bracket on a different vehicle could result in misalignment of the mirror and thus reduce the field of view.

Clearly, it is economically unfeasible to maintain a varied inventory of mirror mount brackets only because of differing vehicle profiles. The need exists, therefore, for a mirror mount assembly that can be readily used with a variety of vehicle profiles without needing to redesign the assembly, to realign the mirror or to interchange specialized parts.

SUMMARY OF THE INVENTION

The present invention provides a mounting bracket assembly that overcomes the aforementioned deficiencies of the prior art. According to one aspect of the invention, a mounting assembly for an outside rear-view mirror is provided which permits the mirror and a support arm to be rotated in a generally horizontal plane, for example, under a force applied during impact or manually to avoid an obstruction. The support arm is rotationally attached to the vehicle at two locations. Self-adjusting means are provided to maintain the axes of rotation at both attachment points colinear, independent of the particular vehicle profile.

The self-adjusting means is generally embodied in the form of a pivot pin which extends through an elongated slot in a lower bracket plate affixed to the vehicle. The pin provides a pivot axis about which the mirror support arm can be rotated. The slot allows for relative movement or angular displacement of the support arm with respect to the fixed plate, such as might occur due to vertical adjustment of the mirror or differences in vehicle profile.

According to another aspect of the invention, a detent mechanism is provided which permits the mirror support arm to be rotated through a plurality of selectable positions, and to retain the arm at a particular position unless sufficient force is applied to the arm to overcome the detent mechanism. Also provided is a simplified structure for allowing vertical adjustment of the mirror and support arm to compensate for vehicle profile or individual driver preferences. In combination with the self-adjusting means, the invention permits a single bracket design to be used in a wide variety of applications.

The present invention also contemplates an overall mounting assembly that is easy to manufacture and operate, has an extended useful life, and involves minimal effort to repair or replace worn components as compared with previous designs shown in the prior art.

These and other aspects, improvements and advantages of the present invention will be more fully and readily understood and appreciated from the following detailed description of the preferred embodiment in view of the accompanying drawings.

BRIEF DESCRIPTION OF THE DRAWINGS

FIG. 1 is a perspective of a mounting assembly for an exterior rear-view mirror in accordance with the present invention;

FIGS. 2 and 3 are examples of typical uses of the mounting assembly of FIG. 1 on vehicles with different profiles;

FIG. 4 is a longitudinal sectional view of the upper bracket for the assembly shown in FIG. 1;

FIG. 5 is a plan view of the upper bracket shown in FIG. 4 with a portion of the top cover removed;

FIG. 6 is a partial cross-section view of the lower bracket for the assembly shown in FIG. 1 taken along the line 6—6;

FIG. 7 is a partial longitudinal section of the lower bracket shown in FIG. 1 taken along line 7—7; and FIG. 8 a simplified plan view of the slotted embossment on the bracket shown in FIGS. 6 and 7 with the bearings and upper rivet portion removed for clarity.

DESCRIPTION OF PREFERRED EMBODIMENTS

With reference to FIG. 1, a mounting assembly in accordance with the present invention includes a generally U-shaped support arm or member 12, a first or upper bracket mechanism 14 and a second or lower bracket mechanism 16. Which bracket mechanism 14, 16 is in practice used as the upper or lower device is of no practical consequence, however, it is preferred to have the arrangement shown in FIG. 1. A typical mirror accessory M is shown in phantom in FIG. 1, and the support arm 12 may be adapted in an appropriate and known manner for mounting the mirror on the support arm, such as by bolts, screws or other convenient means. Also shown in phantom in FIG. 1 is a portion of a vehicle frame F such as a door or side panel of a van or truck. The bracket mechanisms 14, 16 are used to attach the mirror and support arm assembly to the vehicle.

As shown in FIGS. 2 and 3, vehicles may have different profiles, yet it is desirable that the mirror M remain in the same general orientation for proper field of view by the driver. As will be fully explained hereinbelow, the present invention permits the attachment of support arm 12 to a variety of vehicle profiles without a need for any specialized changes or parts in the overall mounting assembly. This results in economization by reducing the number of bracket designs required to serve the many types of vehicles available in today's markets, and also substantially simplifies manufacturability, installation and use.

Referring to FIG. 4, the upper bracket mechanism 14 generally includes a mounting plate 18 and a housing 20 which encloses a detent device 22 (FIG. 5). The housing 20 preferably has a two-piece construction with a top cover 24 and a bottom cover 26. The housing 20 is held together in a conventional manner by a plurality of bolts or screws 28, including a central bolt 30 which also acts as a pivot joint for the support arm 12, as will be described hereinafter.

As depicted in FIGS. 1, 4 and 5, the mounting plate 18 includes a flange portion which can be fixedly attached to the vehicle frame in a conventional manner such as by bolts 19. The plate 18 also includes a plurality of rounded bosses 30 which are retained between the outer flanges of the top and bottom covers 24, 26 when the housing 20 is assembled. When the bolts 28 are loosened slightly, the angular alignment between the housing 20 and the plate 18 can be adjusted in a generally vertical orientation by means of the articulated joint formed by the bosses 30 and the housing 20. Once the desired angle is attained, the bolts 28 can be tightened and the housing 20 and plate 18 will form a rigid structure. Alternatively, of course, the plate 18 and one of the covers of housing 20 could be a one-piece construction if the articulated connection is not deemed necessary for a particular application. However, the articulated connection is preferred since it allows for a broader adjustment of the mirror position for different vehicle profiles or driver preferences.

The position detent mechanism 22 includes a spring biased detent arm 40 which is positioned within a chamber 42 of the housing 20. The detent arm 40 has a peripheral skirt 44 which serves to guide the arm 40 within the chamber 42. A central boss 46 provides an alignment guide for a bias spring 48.

In the preferred embodiment, the support arm 12 has a generally tubular construction with a rectangular cross-section. Attached to the upper end 12A of the support arm 12 is a semicircular extension or wheel 50. The wheel 50 includes a tab 52 adapted to be inserted into the upper support arm end 12A. The arm 12A is then crimped as at 54 to form an interference fit to prevent the wheel 50 from pulling out of the arm 12.

The wheel 50 includes a central hole 56. The housing top cover 24 includes a depending boss 58 which acts as a hub about which the wheel 50 is free to rotate. The boss 58 also serves as a bore for the bolt 31 used to hold the top and bottom covers 24, 26 together.

As best shown in FIG. 1, the housing 20 includes a slot or opening 60 which, in association with the pivoted joint between the wheel 50 and the bracket 14, permits the support arm 12 to be rotated in a generally horizontal orientation or plane. The axis of rotation for the upper arm 12A is defined by the longitudinal axis of the bolt 31.

With reference again to FIG. 5, the wheel 50 includes a plurality of position notches or detents 62. The detent arm 40 includes an extension nub 64 which cooperates with the notches 62 to position the support arm 12 as selected by the user. In FIGS. 1 and 5, the support arm 12 is shown retained in the normal position for rearview use of the mirror M. The support arm 12 is held in place by the detent arm 40 under the force of the spring 48.

There are numerous scenarios in which a driver may want or need to reposition the mirror M and support arm 12 in an unobstructing manner. For example, the vehicle may have to travel down a narrow alley or road. Or, it is usually desirable that in an accident where the mirror is impacted, the mirror and support arm can swing away under such force rather than being broken off or otherwise damaged.

In accordance with the present invention, the mirror M and support arm 12 can be conveniently repositioned by applying a sufficient rotational force to the arm 12 to overcome the retention force of the spring 48. The detent arm 40 slips out of the notch 62 and the arm 12 is free to rotate or pivot about the hub 58. The arm 12 is swung in the desired direction until the detent arm 40 engages the next position notch 62 on the wheel 50. For example, in FIG. 5 the arm 12 is shown in phantom after a counterclockwise rotation of about 90°. In the preferred embodiment, three notches 62 are provided which allow the arm 12 to be retained in positions approximately 90° from normal. Of course, more or less than three notches 62 at various angles could be used on the wheel 50 depending on a particular application. The support arm 12 preferably can be rotated up to 180°.

The notches 62 have beveled sidewalls 66. The detent arm nub 64 also has corresponding beveled edges. These beveled sides permit the detent arm 40 to release from the notches 62 when a sufficient and predeterminable rotational force is applied to the arm 12. The amount of force needed to release the detent arm 40 from the notch 62 can be predetermined by the degree of angle of the beveled sides 66 and the size of the spring 48.

In order to rigidly support the mirror M and secure the arm 12 to the vehicle, the lower mounting bracket 16 is used to attach the lower end 12B of the support arm to the vehicle frame F (FIG. 1).

As best shown in FIGS. 6 and 7, the lower bracket 16 includes a mounting plate 80 having a flange 82 that can be affixed to the vehicle by conventional means such as bolts 84.

The mounting plate 80 is pivotally attached to the support arm lower end 12B by a conventional rivet 86. The plate 80 includes a hemispherical embossment 90 positioned where the rivet 86 passes through the plate 80. A bearing 92 is positioned between the top head 86A of the rivet and the convex portion of the embossment 90. The bearing 92 has a conforming concave surface 94 which abuts the convex surface of the embossment 90.

A second bearing 96 is positioned between the underside of the plate 80 at the concave portion of the embossment 90 and the support arm 12B. The second bearing 96 has a conforming convex surface 98 which abuts the concave surface of the embossment 90.

The bearings 92, 96 are preferably made of a nylon-type material to permit easy rotational movement between the support arm 12 and the bracket plate 80 about the rivet.

As shown in FIGS. 7 and 8, an elongated slot 100 is provided in the embossment 90. The slot 100 is sized so as to permit the rivet 86 to extend through the slot as well as to slide along the longitudinal axis of the slot. The rivet 86 also extends centrally through the bearings 92, 96.

The rivet 86 defines a rotational pivot axis for the lower end 12B of the support arm. As best shown in FIGS. 2 and 3, in order for the support arm 12 to easily rotate between the positions defined by the detent mechanism 22, the pivot axis defined by bolt 30 of the upper mounting bracket 14 should be substantially colinear with the pivot axis defined by rivet 86 of the lower mounting bracket 16. However, as noted, different vehicles may have different profiles, thereby causing a change in the angular alignment between the support arm 12B and the plate 80. This non-parallel misalignment occurs because the plate 80 orientation is fixed due to its rigid attachment to the vehicle, whereas the support arm 12 orientation depends on the mirror adjustment needed as well as the position of the upper mounting bracket 14. The slot 100 in the lower mounting bracket 16 permits relative movement between the support arm 12 and the plate 80 so that the rivet 86 remains in colinear and axial alignment with the upper bracket 14 pivot axis. That is, the nylon bearings 92, 94, the rivet 86 and the slot 100 cooperate to allow the plate 80 to shift or slide between the bearings relative to the support arm 12B so that the support arm 12 can be adjusted to the desired orientation. Preferably, the longitudinal or major axis of the slot 100 is generally transverse the pivot axis defined by the bolt 30 and rivet 86 when the rivet 86 is at the center of the slot 100; and further the major axis of the slot 100 is generally transverse to the vehicle side profile. This orientation permits the support arm 12 to pivot in a generally vertical direction to accommodate various vehicle profiles. In the preferred embodiment, the support arm can freely pivot plus 14° or minus 14° in the vertical direction by self-adjustment of the rivet 86 within the slot 100. Of course, the articulated joint between the housing 20 and plate 18 as described hereinabove also can be used to compensate for variations in the vehicle profile. However, use of the slot 100 arrangement allows more flexibility in that the articulated joint in the upper bracket 14 can be used to properly align the mirror M for optimum rear view; then, once that alignment is selected and the upper bracket is affixed to the vehicle, the rivet and slot arrangement in the lower bracket 16 allows an additional degree of freedom which automatically compensates for vehicle profile.

It can thus be appreciated that the present invention provides an impact or user displaceable mirror mounting bracket assembly that self-adjusts to use of the assembly on vehicles having different profiles, without the need for bracket parts particularly adapted to only certain vehicles. The improved detent mechanism also provides a simple yet reliable mirror position adjustment means that is easy to assemble and/or repair.

While the invention has been shown and described with reference to the preferred embodiment thereof, it will be appreciated by those skilled in the art that such description is for exemplary purposes and that variations in details can be made within the spirit and scope of the present invention as set forth in the appended claims.

What is claimed is:

1. A self-adjusting mounting assembly for attaching an outside rear-view mirror to a vehicle comprising: an elongated support member adapted to mount a mirror thereon, first bracket means for attaching one end of said support member to the vehicle and second bracket means for attaching an opposite end of said support member to the vehicle, said first bracket means includes a plate that can be affixed to the vehicle, said first bracket means being connected to said support member one end by a first pivot pin so that said support member can be selectively rotated about an axis defined by said first pivot pin, said second bracket means includes a second plate that can be affixed to the vehicle, said second plate being rotatably connected to said support member opposite end by a second pivot pin, and self-adjusting means constructed and arranged to mount on differing vehicle profiles while maintaining mirror alignment, said self adjusting means being operatively associated with said second bracket means and said second pivot pin to maintain said second pivot pin in axial alignment with said first pivot pin, said self adjusting means including a rounded embossment on said second plate with an elongated slot in said embossment and a bearing positioned between said second plate and said support member, said second pivot pin extending through said slot and bearing and holding said second plate and said support member in relative fixed position with respect to each other, said second pivot pin having a diameter slightly less than the minor axis of said slot so that said pin can travel along the major axis of said slot in response to changes in the angular relationship between said second plate and said support member.

2. An assembly according to claim 1 wherein said bearing has a conforming convex side which abuts said embossment on said embossment's concave side.

3. An assembly according to claim 2 wherein said second pivot pin has a head at each end and further comprising a second bearing positioned between one head of said second pin and said embossment's convex side, said second bearing having a conforming concave surface which abuts said embossment convex side.

4. An assembly according to claim 3 wherein said bearings are made of nylon and said second pivot pin is a rivet.

5. An assembly according to claim 1 wherein said first bracket means includes a housing having a top and bottom.

6. An assembly according to claim 5 further comprising detent means for selectively positioning said support member relative to said vehicle by rotating said support member about said first pivot pin.

7. An assembly according to claim 6 wherein said detent means comprises a position wheel affixed to said support member one end, said wheel having a plurality of notches about its perimeter corresponding to selectable positions of said support member, and a spring biased detent arm abutting said wheel perimeter, said detent arm cooperating with one of said notches to maintain said support member at each selected position, said detent arm releasing from said notch when sufficient rotational force is applied to said support member to overcome said detent arm spring bias, and said first pivot pin extends through the center of said wheel.

* * * * *